United States Patent [19]
Morita

[11] Patent Number: 5,892,635
[45] Date of Patent: Apr. 6, 1999

[54] SERVO WRITER FOR MAGNETIC DISK DRIVE AND SERVO WRITING METHOD

[75] Inventor: Isao Morita, Hanno, Japan

[73] Assignee: Kabushiki Kaisha Toshiba, Kawasaki, Japan

[21] Appl. No.: 719,368

[22] Filed: Sep. 25, 1996

[30] Foreign Application Priority Data

Jun. 24, 1996 [JP] Japan ................................ 8-163039

[51] Int. Cl.⁶ ................................................ G11B 5/596
[52] U.S. Cl. .................................... 360/77.02; 360/73.03
[58] Field of Search ......................... 369/44.27, 44.32, 369/47, 50, 53, 54, 58; 360/73.01, 73.03, 75, 77.01, 77.02, 77.04, 77.06, 77.07, 77.08

[56] References Cited

U.S. PATENT DOCUMENTS

| | | | |
|---|---|---|---|
| 5,381,281 | 1/1995 | Shrinkle et al. | 360/77.08 |
| 5,594,595 | 1/1997 | Zhu | 360/73.03 X |
| 5,684,650 | 11/1997 | Kadlec et al. | 360/77.04 X |

FOREIGN PATENT DOCUMENTS

| | | |
|---|---|---|
| 58-171768 | 10/1983 | Japan . |
| 63-273285 | 11/1988 | Japan . |
| 7-211029 | 8/1995 | Japan . |

*Primary Examiner*—Paul W. Huber
*Attorney, Agent, or Firm*—Finnegan, Henderson, Farabow, Garrett & Dunner, L.L.P.

[57] ABSTRACT

A CPU instructs a VCM driver, a spindle motor driver and a servo data reading or writing circuit, to writing servo data for error detection at any of default rotation frequencies stored in a memory. A positioning error signal analyzer detects a positioning error from the written servo data for error detection, and CPU determines an optimal disk rotation frequency from this positioning error.

13 Claims, 7 Drawing Sheets

SERVO WRITER FOR MAGNETIC DISK DRIVE AND SERVO WRITING METHOD

BACKGROUND OF THE INVENTION

1. Field of the Invention

The present invention relates to a servo writer and a servo writing method, for writing servo data in a magnetic disk loaded in a magnetic disk drive. More particularly, the invention relates to the servo writer and the servo writing method for writing high-quality servo data in the magnetic disk by optimizing the rotation frequency (rotation speed) of the magnetic disk.

2. Description of the Related Art

Figure 1:
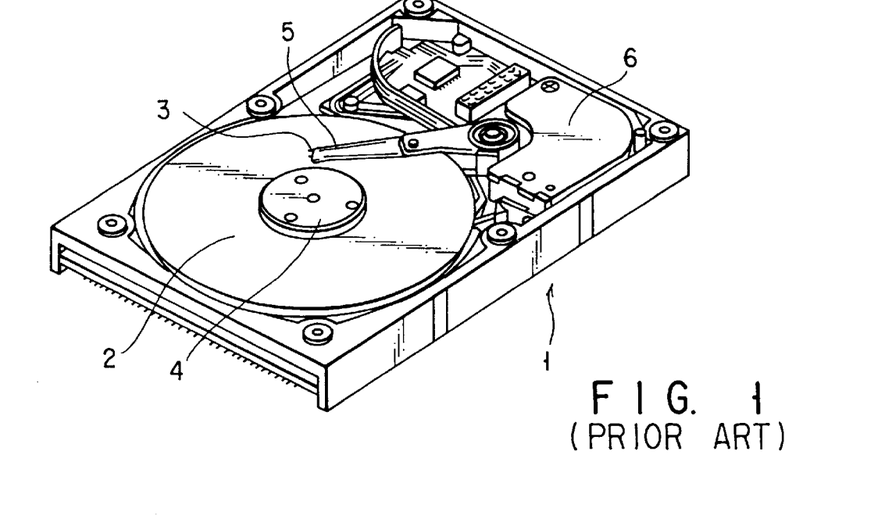
FIG. 1 is a perspective view showing an internal structure of a conventional magnetic disk drive.

Generally, a hard disk drive (HDD), or a magnetic disk drive, is used as a storage device for a desk-top type personal computer or a notebook type portable computer. FIG. 1 is a perspective view showing the internal structure of this magnetic disk drive 1. The magnetic disk drive 1 is a device for recording and reproducing data on a recording medium (disk) 2 by using a magnetic head 3. The recording medium 2 is manufactured by coating and depositing a magnetic recording film on a disk-like substrate. The magnetic disk 2 is rotated at a high speed by a spindle motor 4. The magnetic head 3 is held in a carriage 5. The magnetic head 3 is enabled to move on the magnetic head 2 in its radial direction, by moving the carriage 5 by means of a voice coil motor (VCM) 6.

The magnetic head 3 is thus positioned in a desired place on the magnetic disk 2 by means of the voice coil motor 6. The head 3 is positioned by a so-called embedded servo method. In this method, a plurality of servo data portions are provided in the all track of a whole data face, during manufacturing of a magnetic disk drive, that is, in the process of writing servo data into the magnetic disk 2 (servo writing). These servo data portions are basically composed of cylinder code portions in which cylinder codes are embedded, and correction portions in which data to be used for detecting and correcting positional shifts are written. In the magnetic disk drive 1, a desired track is accessed by the magnetic head 3 by detecting the cylinder codes of the cylinder code portions. The current position of the magnetic head 3 is then detected and corrected by detecting discretely data recorded in the correction portions (several times for each track). The magnetic head 3 can thereby be positioned in a desired position on the magnetic disk 2 with high accuracy.

Figure 2:
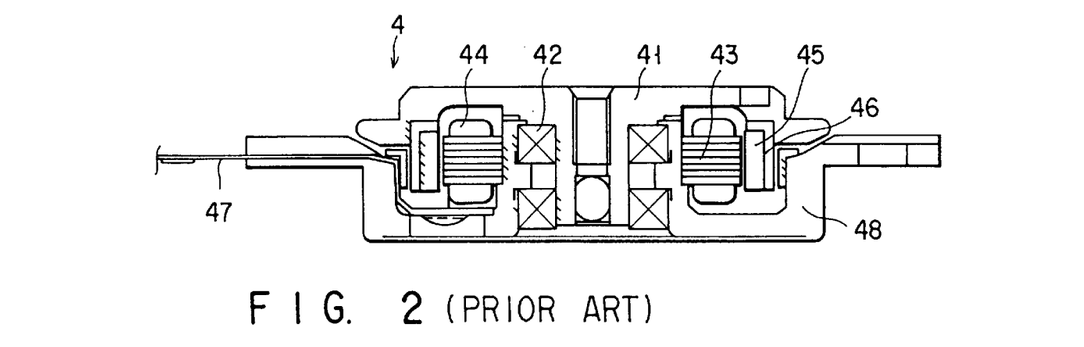
FIG. 2 is a sectional view showing a structure of a spindle motor applied to the magnetic disk drive shown in FIG. 1.

FIG. 2 illustrates an example of the structure of the spindle motor 4. The components of the spindle motor 4 shown in FIG. 2 are provided under the magnetic disk 2 in the magnetic disk drive 1. A hub 41 is rotated at a high speed together with the magnetic disk 2 attached thereto. A bearing 42 supports the rotary shaft of the hub 41 rotating at a high speed.

A coil 43 is wound around a stator core 44. A control current is supplied to this coil 43 by FPC (Flexible Printed Circuit) 47. A magnet 45 forms an electromagnetic driving element, together with the coil 43. This magnet 45 is connected to the hub 41 via a back yoke 46. A motor base 48 holds the spindle motor 4 having the above-noted structure and is connected to the base of the casing of the magnetic disk drive 1. In the spindle motor 4 thus constructed, a control current is supplied to the coil 43, whereby the hub 41, the magnet 45 and the back yoke 46 are rotated at high speed together with the magnetic disk 2.

In recent years, it is demanded that data be recorded at high density on a smaller magnetic disk 2 so that the magnetic disk drive may become smaller. Accordingly, pitches in order of microns have been employed for data track pitches.

In order to provide such narrow track pitches in the magnetic disk drier 1, however, NRRO (Non Repetitive Run Out) of the spindle motor 4 must be reduced in the mechanical system of the magnetic disk drive, and the rigidity of the whole mechanical system including the carriage 5 must be increased. The magnetic head must be accurately positioned at a predetermined position in the magnetic disk drive. To this end, accurate servo data needs to be written in the magnetic disk.

In recent years, it is also demanded that the storage capacity of a magnetic disk drive be increased. The number of magnetic disks mounted in the magnetic disk drive is directly proportional the storage capacity of the drive. Thus, to meet the demand for increasing capacity, it is necessary to mount as many magnetic disks as possible within the limited space available in the casing of the magnetic disk drive.

As described above, in the conventional magnetic disk drive, a maximum number of magnetic disks need to be mounted within the casing to meet the request for a greater storage capacity. To provide a space accommodating the disks, the base of the casing should be thin. If the base is this, however, it cannot withstand the load, i.e., the spindle motor and the associated components. The thin base for the casing would reduce the rigidity of the mechanical system. This would increase the possibility of a resonance.

The resonance may cause inconveniences like those described hereinbelow. Servo data would be written in a vibratory manner during servo writing, making unstable the servo data referenced as a yardstick in positioning. Consequently, it would be impossible to position accurately.

If servo data has been written accurately and the resonance occur in use of the magnetic disk drive, it is impossible to keep the accuracy of positioning high level. In any case, if the resonance occur, it is impossible to keep positioning accuracy high.

Figure 3:
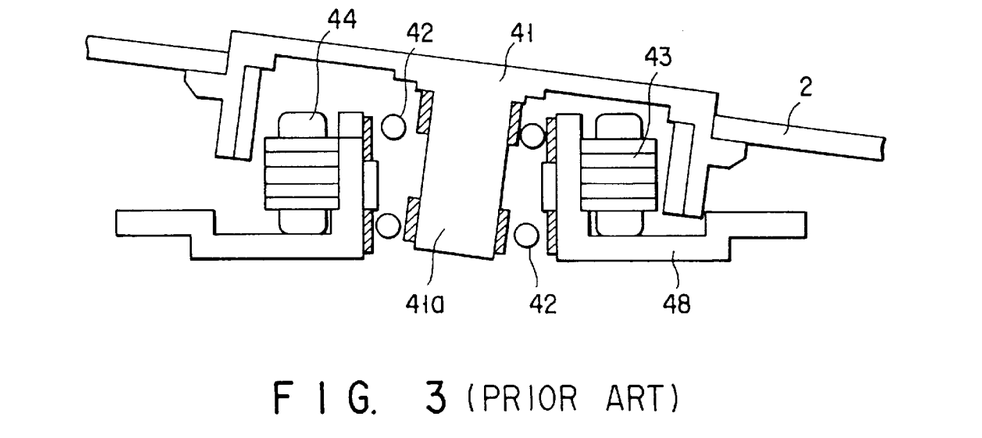
FIG. 3 is a sectional view showing falling of the spindle motor shown in FIG. 2.

FIG. 3 illustrates the deformation of the spindle motor 4 because of the occurrence of the resonance. The bearing 42 rotatably supporting the shaft 41a of the hub 41 is shown in its deformation. As shown in FIG. 3, when the magnetic disk 2 inclines and falls down, the magnetic disk 2 is displaced in its radial direction against the magnetic head 3. Such displacement of the magnetic disk 2 in its radial direction causes a positioning error and makes it impossible to position accurately. The deformation of the bearing 42 is shown in FIG. 3. However, because of the occurrence of the resonance, the motor base 48, the magnetic head 3 or the carriage 5 may be deformed. In this case, as in the case of that shown in FIG. 3, it is impossible to position accurately. The positioning error means the quantity of head positional shift from the position in which reference servo data has been written, and thus this head positional shift will be called a positioning error hereinafter.

Conventionally, writing of servo data in the magnetic disk, that is, servo writing has been performed at writing rotation frequency (rotation speed) equal to disk rotation frequency (disk rotation speed) during use of the magnetic disk drive. In recent years, methods described hereinbelow have been employed.

In the first method, the quality of servo data written in the magnetic disk is made stable by performing servo writing at such a rotation frequency that resonance is hardly occur.

In the second method, the quality of servo data is made stable by performing servo writing at a rotation frequency much lower than that of the magnetic disk used in the magnetic disk drive.

In the case of the first method, even if a rotation frequency is determined so as to make it difficult for the resonance to occur, there is variance in resonance frequencies depending on the magnetic disk drive itself, for instance, variance in accuracy or assembling of parts constituting the magnetic disk drive. Therefore, it is difficult to completely prevent the occurrence of the resonance.

In the case of the second method, servo writing is performed at a rotation frequency considerably lower than that in use, and vibrations are reduced by minimizing vibratory energy. However, this also entails some inconveniences.

When a rotation frequency is determined to low level, the floating height of the magnetic head from the magnetic disk declines and thus the head may come into contact with the disk. Therefore, even if the rotation frequency is determined to low level, it is also difficult to completely prevent the occurrence of the resonance.

A condition for using the magnetic disk drive when servo writing is to be performed, is usually different from that in using the disk drive. More particularly, since the servo writer has been connected to the magnetic disk drive, the state of the magnetic disk drive, during servo writing, is different from that when this disk drive is used singularly. Therefore, even if a rotation frequency is determined so as to prevent the occurrence of the resonance and when the magnetic disk drive is singularly used, the resonance may occur during servo writing.

SUMMARY OF THE INVENTION

It is an object of the invention to improve the quality of servo data written in the magnetic disk by preventing the occurrence of the resonance phenomenon during servo writing.

According to a first aspect of the invention, there is provided a servo writer for writing servo data in a magnetic disk drive having a spindle motor and a magnetic disk for recording data rotated by the spindle motor, the servo writer comprising: driving means for driving the spindle motor; writing means for writing data in a specified area in the magnetic disk; control means for controlling the driving means and the writing means, so as to rotate the magnetic disk at a predetermined rotation frequency and write for measurement in the magnetic disk; detecting means for detecting a vibratory characteristic of the magnetic disk drive during writing of the data for measurement; optimizing means for optimizing a rotation frequency of the magnetic disk, in accordance with the vibratory characteristic detected by the detecting means; and servo data writing means for controlling the driving means and the writing means, so as to write servo data at the rotation frequency optimized by the optimizing means.

According to a second aspect of the invention, there is provided a servo writing method in a serve writer for writing servo data in a magnetic disk drive having a spindle motor and a magnetic disk for recording data rotated by this spindle motor, the servo writer comprising a driving means for driving the spindle motor and writing means for writing data in a specified area in the magnetic disk, the method comprising the steps of: controlling the driving means so as to rotate the magnetic disk at predetermined rotation frequency; writing data for measurement in the magnetic disk; detecting a vibratory characteristic of the disk drive during writing of the data for measurement; optimizing a rotation of the magnetic disk in accordance with the vibratory characteristic detected by the detecting step; and controlling the driving means and the writing means so as to write servo data at the rotation frequency optimized by the optimizing step.

In the servo writer and the servo writing method, the data for measurement is written in the magnetic disk. On the basis of the servo data or the result detected during writing of this servo data, the optimal rotation frequency for the magnetic disk is determined in preparation for servo writing (optimization of the rotation frequency). The magnetic disk is rotated at this rotation frequency, thereby improving the quality of servo data written in the magnetic disk, without producing any resonance phenomena. This makes it possible to perform highly accurate positioning control when the magnetic disk drive is actually used.

According to a third aspect of the invention, there is provided a magnetic disk drive in which servo writing is performed by a servo writer having detecting means for writing data for measurement in a magnetic disk, detecting a vibratory characteristic of the magnetic disk drive during writing of the data for measurement, and optimizing means for optimizing a rotation frequency of the magnetic disk in accordance with the vibratory characteristic detected by the detecting means, the magnetic disk drive comprising: a magnetic disk in which servo data is written at the rotation frequency optimized by the optimizing means; and a spindle motor for rotating the magnetic disk.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

DETAILED DESCRIPTION OF THE PREFERRED EMBODIMENTS

The preferred embodiment of the servo writer of the invention will now be described with reference to the accompanying drawings.

Figure 4:
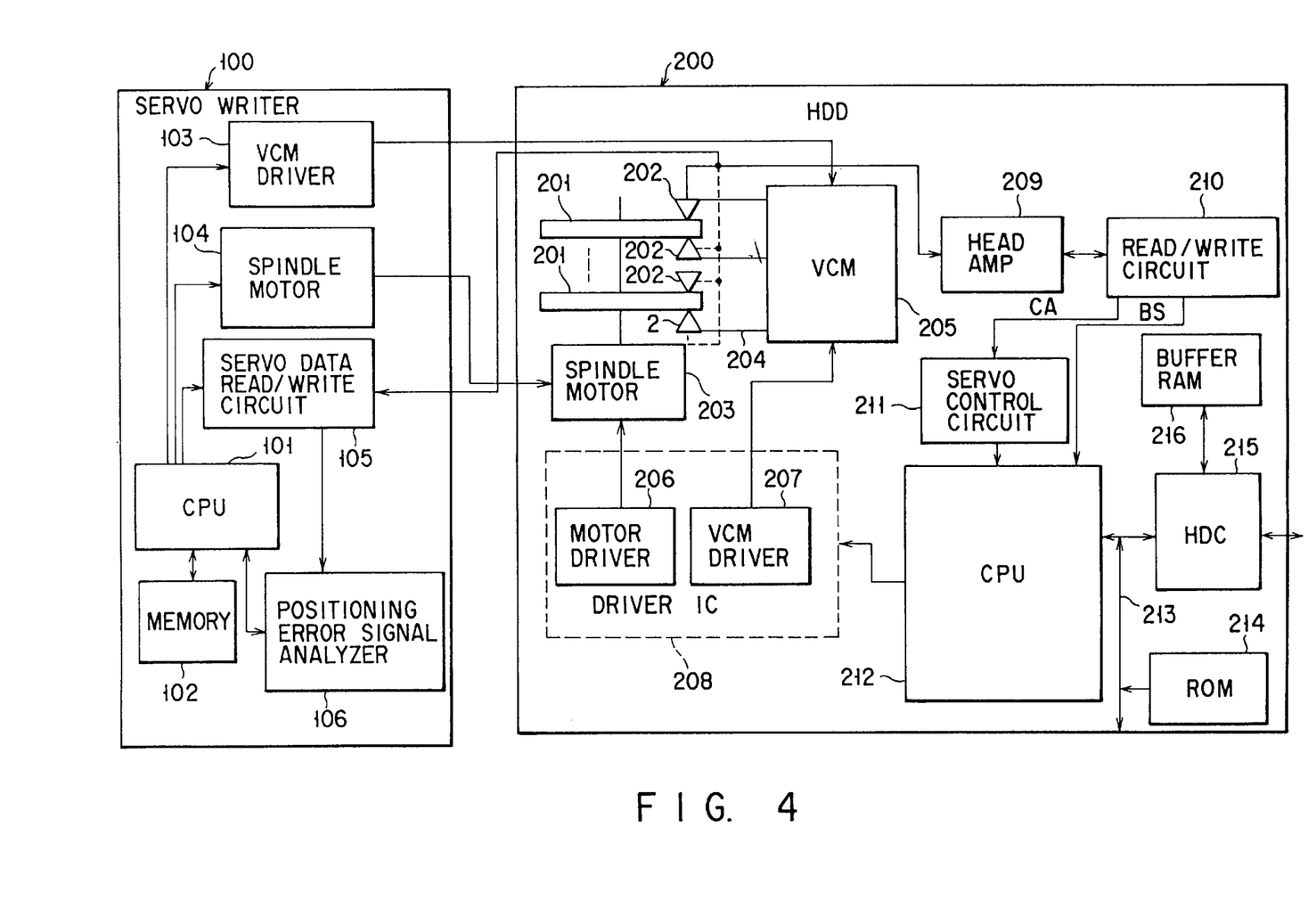
FIG. 4 is a block diagram showing structures of servo writer and a magnetic disk drive connected to this servo writer of an embodiment of the invention.

FIG. 4 illustrates the structures of the servo writer and the magnetic disk drive (HDD) of the invention, and the servo writer is connected to the magnetic disk drive. The drawing shows the state of connection when servo data is written in a magnetic disk 200 by using a servo writer 100. The servo writer 100 writes servo data for error detection before performing servo writing for writing servo data, and determines a disk rotation frequency best suited to servo writing, from a positioning error signal obtained from this servo data. In the present specification, the "rotation frequency" means a rotation speed of the disk. It is a known fact that the rotation speed (rpm) is given by multiplying the rotation frequency by 60.

Figure 5:
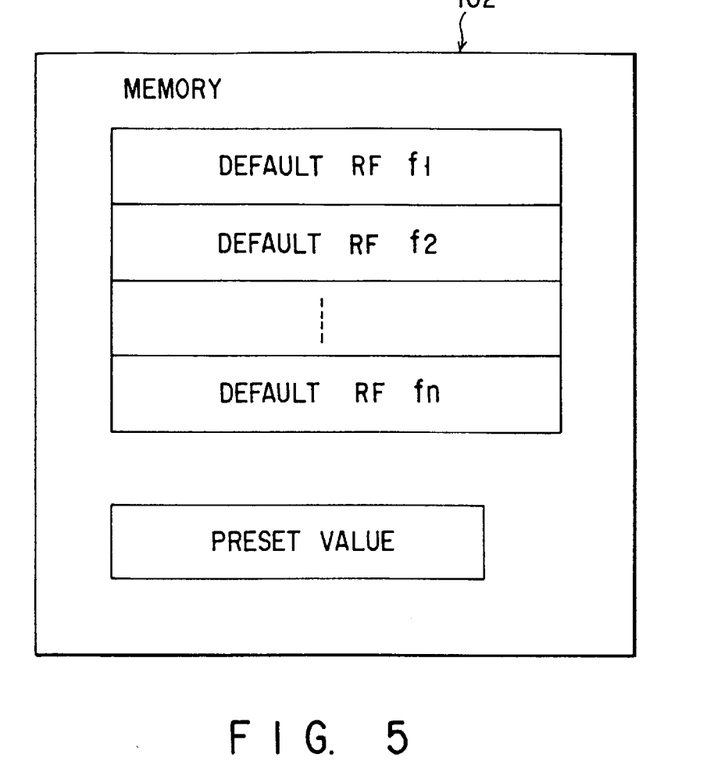
FIG. 5 is a view showing information stored in a memory of he servo writer shown in FIG. 4.

The servo writer 100 is provided with CPU (Central Processing Unit) 101 for controlling the writer as a whole. A memory 102 is connected to this CPU 101. As shown in FIG. 5, the memory 102 stores default rotation frequencies RF1 to RFn and a preset value referenced for determining whether servo writing should be performed or not, in addition to a program necessary for control process of CPU 101. This preset value indicates a limit for writing servo data with accuracy without the occurrence of a resonance in the magnetic disk drive. The number n of default rotation frequencies is preferably set to 5 to 10.

CPU 101 is provided with functions for determining as to an optimal disk rotation frequency, for instance comparing a positioning error, later described, with the preset value stored in the memory 102, etc.

A voice coil motor (VCM) driver 103, a spindle motor driver 104 and a servo data read/write (R/W) circuit 105 are connected to CPU 101. CPU 101 supplies a VCM control signal to the VCM driver 103 such that the magnetic head of the magnetic disk drive targeted for servo data writing may be positioned in a predetermined track. CPU 101 also supplies a spindle motor control signal to the spindle motor driver 104 such that the magnetic disk of the magnetic disk drive targeted for servo data writing may be rotated in accordance with the default rotation frequency stored in the memory 102. CPU 101 further supplies a read/write control signal to the servo data read/write circuit 105 so as to control writing of servo data, writing of error detection servo data and reading of a positioning error signal.

The driver 103 drives the voice coil motor of the magnetic disk drive targeted for servo data writing, in response to the VCM control signal supplied from CPU 101. The spindle motor driver 104 drives the spindle motor of the magnetic disk drive targeted for servo data writing, in accordance with the spindle motor control signal supplied from CPU 101.

The servo data read/write circuit 105 executes writing of servo data in the magnetic disk targeted for servo data writing and reading/writing of servo data for error detection in accordance with read/write control signal from CPU 101. The servo data for error detection enables the positioning error of servo data written from the magnetic head in the magnetic disk to be detected and for instance, burst data may be utilized. This servo data for error detection is written in a specified location in the magnetic disk, for instance in the data area outer peripheral portion or the inner peripheral portion of the magnetic disk. The servo data read/write circuit 105 outputs data obtained by reading the servo data for error detection from the targeted magnetic disk as a positioning error signal to a positioning error signal analyzer 106.

Figure 6:
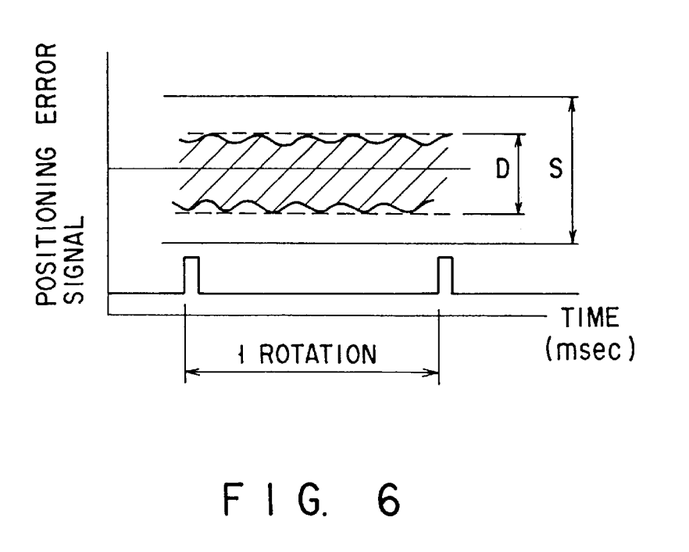
FIG. 6 is a view illustrating processing by a positioning error signal analyzer of the servo writer shown in FIG. 4.

The positioning error signal analyzer 106 calculates a positioning error from the positioning error signal sent from the servo data read/write circuit 105 under control of CPU 101. In the embodiment, CPU 101 instructs the servo data read/write circuit 105 to execute reading-in of positioning error signals up to the specified number of rotations and the positioning error signal analyzer 106 to generate, as shown in FIG. 6, a wave form laminating positioning error signals equivalent to one rotation. A positioning error D is then calculated from this wave form and sent to CPU 101. A width S shown in FIG. 6 is a preset value stored in the memory 102.

Next, the structure of the magnetic disk drive (HDD) 200 will be described. The appearance of this magnetic disk drive 200 is the same as that of the drive shown in FIG. 1. As shown in FIG. 1, in the magnetic disk drive 200, a plurality (or one) of disks 201 are rotated at a high speed by a spindle motor 203 and a plurality of magnetic heads 202 are provided oppositely to the respective data faces of the disks 201. When the number of disks 201 is one, two magnetic heads 202 are provided oppositely to both surfaces of the disk 201. The magnetic heads 202 are attached to a head moving mechanism called a carriage 204 and moved in the radial directions of the disks 201 according to the rotation of this carriage 204. The magnetic heads 202 are position-controlled on specified target cylinders (target tracks) by a servo processing system, later described, (head positioning control mechanism) and normally reads/writes data by sector units.

The carriage 204 are driven by a voice coil motor (VCM) 205. The voice coil motor 205 is in turn driven by a VCM driver 207. The spindle motor 203 is driven by a motor driver 206. In the embodiment, the motor driver 206 and the VCM driver 297 are integrally constructed as a driver IC (Integrated Circuit) 208 called a double driver.

A read/write circuit 210 inputs a read signal amplified by a head AMP 209 and obtained from the magnetic head 202 and executes signal processing necessary for a data reproducing operation. The read/write circuit 210 also executes signal processing necessary for a data recording operation and supplies a write current based on write data through the head AMP 209 to the magnetic head 202.

The read/write circuit 210 typically performs recording/reproducing of user data and reproducing of servo data necessary for servo processing for head positioning control. The servo data contains a cylinder address CA indicating the current position of the magnetic head 202 and burst data (burst signal) BS indicating a positioning error in the cylinder.

The read/write circuit 210 is provided with an AGC AMP having AGC (Automatic Gain Control), a pulse generator and a peak holder. The pulse generator outputs a data pulse containing the cylinder address CA, being provided with a pulse peak detector (PPD) for identifying read data or a synchronous pulse from a read signal from the magnetic head 202. The peak holder holds the read signal from the magnetic head 202 as a sample and outputs an analog signal containing the burst signal BS.

A servo control circuit 211 executes signal processing necessary for servo processing and extracts and holds the cylinder address CA from the data pulse output from the read/write circuit 210. The servo control circuit 211 also outputs a sample timing signal for extracting the burst signal BS and executes extraction of a sector pulse.

CPU 212 performs head positioning control together with the servo control circuit 211. CPU 212 performs various kinds of driving control of the magnetic disk drive 200 including transfer control of read/write data, in addition to head positioning control. CPU 212 performs these based on a control program stored in ROM 214. ROM 214 is a nonvolatile memory composed of EEPROM or PROM (Programmable ROM) and connected through an internal bus 213 to CPU 212.

HDC 215 is a controller mainly for transferring read/write data, constituting an interface between HDD and a host computer. HDC 215 temporarily stores sector unit data read from the disk 201 or data written in the disk 201 in buffer RAM 216. HDC 215 and CPU 212 constitute a system for performing data transfer control.

Next, processing for determining a disk rotation frequency in the embodiment will be described by referring to the flow chart of FIG. 7.

CPU 101 first rotates the magnetic disk 201 at any one (default FRi) of the default rotations speeds FR1 to FRn stored in the memory 102. CPU 101 then outputs a spindle motor control signal to the spindle motor driver 104 and a read/write control signal to the servo data read/write circuit 105. The spindle motor driver 104 drives the spindle motor 203 of the magnetic disk drive 200 in response to the spindle motor control signal such that the magnetic disk 201 is rotated at the default rotation frequency specified by CPU 101. The servo data read/write circuit 105 writes the servo data for error detection in a specified spot (specified track) in the magnetic disk 201, by using the magnetic head 202, in response to the read/write control signal from CPU 101 (step S1).

After writing of the servo data for error detection has been completed, CPU 101 instructs the servo data read/write circuit 105 to read the servo data for error detection, up to the predetermined number of rotations of the magnetic disk 201. The servo data read/write circuit 105 reads the servo data for error detection from the magnetic disk 201, and outputs this as a positioning error signal to the positioning error signal analyzer 106 (step S2).

The positioning error signal analyzer 106 generates, as described above, a wave form overlapping positioning error signals equivalent to one rotation, calculates a positioning error D from this wave form and sends this to CPU 101 (step S3). CPU 101 then compares the positioning error D with a preset value (width S) stored beforehand in the memory 102 (step S4).

When finding that the positioning error D is less than the preset value S (step S4, NO), CPU 101 determines the default rotation frequency FR1 previously predetermined to the spindle motor driver 104 as a rotation frequency for the magnetic disk 201 (step S5). Thereafter, the magnetic disk 201 is rotated at the rotation frequency determined in step S5 and original processing for writing servo data (servo write processing) is performed.

When finding that the positioning error D is equal to the preset value S or higher (step S4, YES), CPU 101 determines as to whether any default rotation frequencies not used for writing of the servo data for error detection exist, or not among the default rotations speeds FR1 to FRn stored in the memory 102 (step S6). If default rotation frequencies not used for writing of the servo data for error detection are found to exist (step S6, YES), CPU 101 determines any of these default rotation frequencies, if a plurality exists, as a default rotation frequency FRi used for writing of the servo data for error detection (step S7). Thereafter, the process of step S1 to S4 is performed. In step S7, the default rotation frequency FRi is preferably determined depending on a proportional relationship between the calculated positioning error and the default rotation frequency.

When finding that any default rotation frequencies not used for writing of the servo data for error detection do not exist, that is, if the result of measurement (positioning error D) less than the preset value (width S) is not obtained even when all the default rotation frequencies stored in the memory 102 are checked (step S6, NO), CPU 101 determines that abnormality has occurred in the magnetic disk drive 200 and notifies this to an operator (step S8).

In this manner, an optimal rotation frequency for the magnetic disk 201 is determined during servo write processing. By rotating the magnetic disk 201 at this optimal rotation frequency, it is possible to improve the quality of servo data written in the magnetic disk 201 without any resonance occurring. This makes it possible to perform accurate positioning control when the magnetic disk drive 200 is used.

The embodiment is described on the precondition that the number n of default rotation frequencies are provided. When a programmable driver for the rotation frequency applies to the servo writer, a servo write rotation frequency f may be used, which is given by the following equation:

$$f = FRi \pm n\Delta f$$

where $\Delta f$ is a changing amount of the rotation frequency.

Figure 8A:
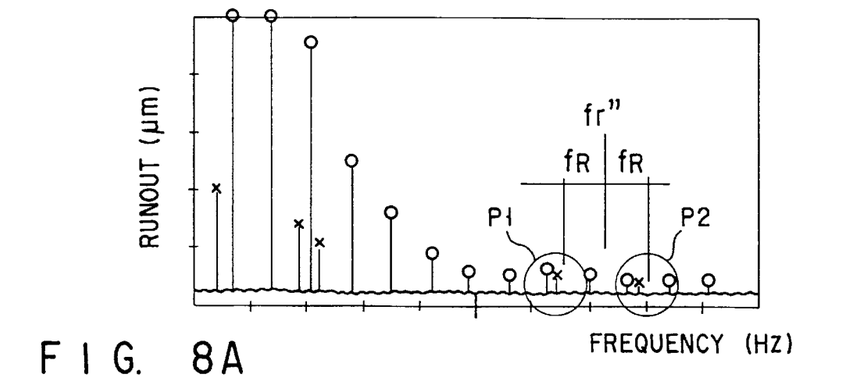
FIGS. 8A to 8C are graphs illustrating effects provided by the servo writer shown in FIG. 4.
Figure 8B:
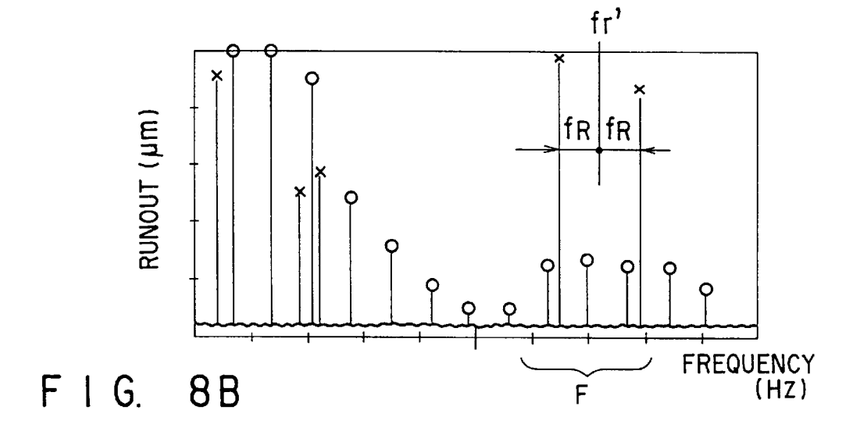
Figure 8C:
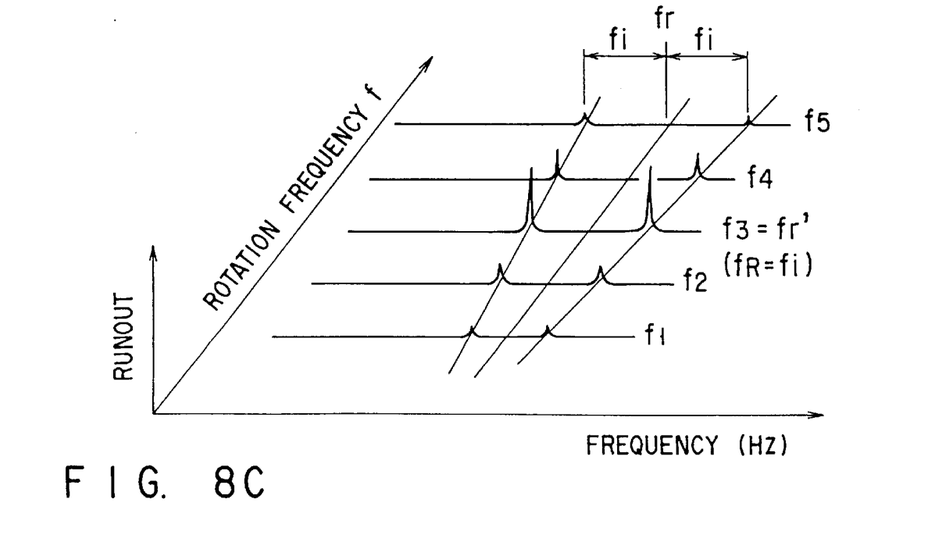

FIGS. 8A to 8C show examples of the results of measuring NRRO (Non Repetitive Run Out) spectra.

The NRRO is a basic motor characteristic, typically indicating an asynchronous component (vibratory component not in synchronization with a rotation other than the integral multiple of a basic rotation frequency) of vibration of a motor rotary system in its radial direction. Being dependent upon a component synchronizing with a rotation, normal vibration is not such a big problem as long as the value of the synchronous component is constant. To put it in a simpler manner, even when servo data written in the magnetic disk is not completely round but synchronously deformed (waved), the magnetic head moves along this waviness and thus it is not such a big problem.

However, an asynchronous component is not in synchronization with a rotation. This means that since a vibratory position is not specified, and head positioning accuracy will be greatly affected.

The main cause of the asynchronous component is the passing frequency of the bearing. For example, if this introduction, a rotation frequency and inner and outer ring rotation frequencies are specified, a ball bearing may calculate the revolving frequency of a retainer, a frequency caused by ball accuracy, a frequency caused by the inner ring and a frequency caused by the outer ring. Such basic frequencies and higher harmonic components thereof are called passing frequencies. FIG. 8A illustrates a synchronous component and an asynchronous component that occur in the magnetic disk drive. A vibration marked by ○ represents a synchronous component while a vibration marked by × represents an asynchronous component. Normally, as shown in FIG. 8A, NRRO, or, an asynchronous component of a level to be ignored by the drive, occurs.

However, if the resonance frequency of the mechanical system and the higher harmonic component of the passing frequency are overlapped, an asynchronous component thereof will increase, reaching a level not to be ignored by the drive. When a vibratory mode is a mode for falling of the magnetic disk, with respect to a falling resonance frequency fr, there is a vibration peak in its ±fi (rotation frequency)

because of the gyrotron effect of a rotary pair. In FIG. 8A, the rotation frequency ±fR of this resonance frequency fr" is not overlapped with the higher harmonic component of the passing frequency, as represented by P1 and P2. In FIG. 8B, as noted above, an asynchronous component increases, reaching a level not to be ignored by the drive. These resonance frequencies fr' and fr" are dependent upon the mechanical system of the magnetic disk drive.

FIG. 8C illustrates typical vibrations when rotation frequencies are changed to f1 to f5 in the vicinity of the resonance frequencies. In the drawing, since the rotation frequency f3 is coincident with the resonance frequency fr', fr' ±fR overlap with the asynchronous component, producing a big vibration.

In the embodiment, such an asynchronous component increases. An optimal rotation frequency may be determined by preventing the rotation frequency of the magnetic disk. That is, in FIG. 8C, servo write processing may be performed at a rotation frequency different from the rotation frequency f3.

Figure 9A:
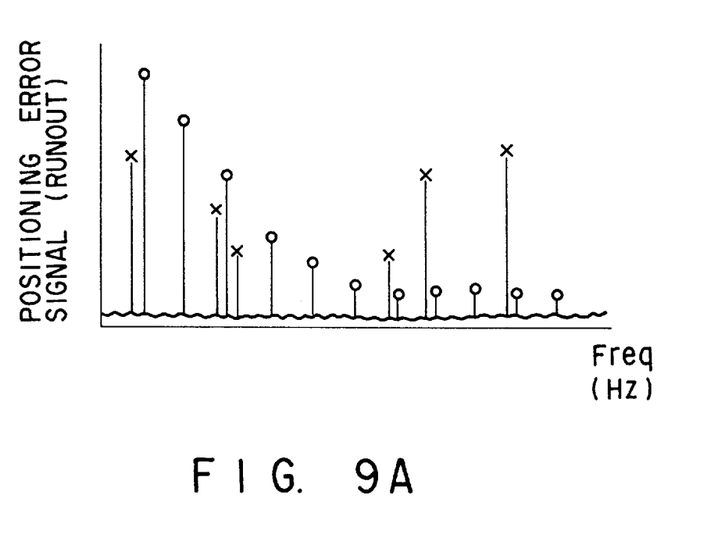
FIGS. 9A and 9B are graphs illustrating modified examples of the positioning error signal analyzer of the servo writer shown in FIG. 4.

In the above-discussed embodiment, the positioning error signal analyzer 106 generates, as shown in FIG. 6, a wave form overlapping positioning error signals equivalent to one rotation, and calculates a positioning error D from this wave form. However, the analyzer 106 may generate a frequency axis wave form like that shown in FIG. 9A. A time wave form shown in FIG. 6 provides information about a vibration regarding the spindle motor 203, while a frequency axis wave form shown in FIG. 9A provides a comprehensive positioning error spectrum for the magnetic disk drive 200 during writing of the servo data for error detection. This time axis wave form may be obtained by effectuating FFT (First Fourier Transform) on a signal shown in FIG. 6.

Figure 9B:
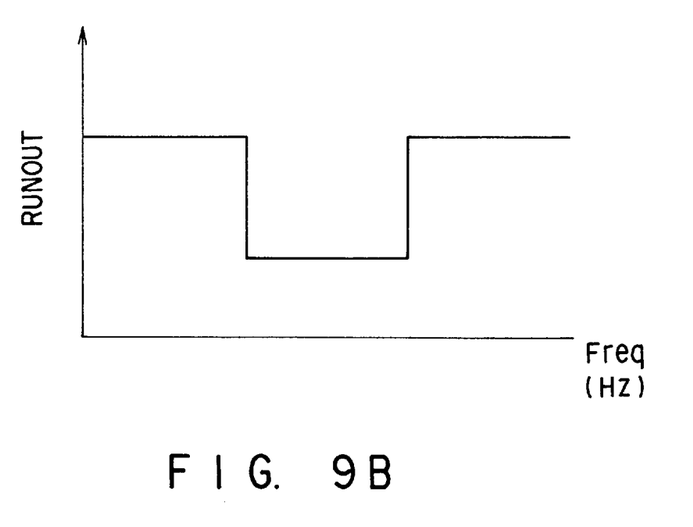

When the positioning error signal analyzer 106 generates a frequency axis wave form, it is necessary to add data indicating a limit of vibration with respect to a frequency like that shown in FIG. 9B, to the preset value stored in the memory 102. In the case, the limit of vibration with respect to a frequency is determined in accordance with the frequency response of the servo system mounted in the drive. CPU 101 further determines, in step S4, whether the frequency axis wave form of the positioning error signal analyzer 106 is less than the limit stored in the memory 102 or not.

Figure 10:
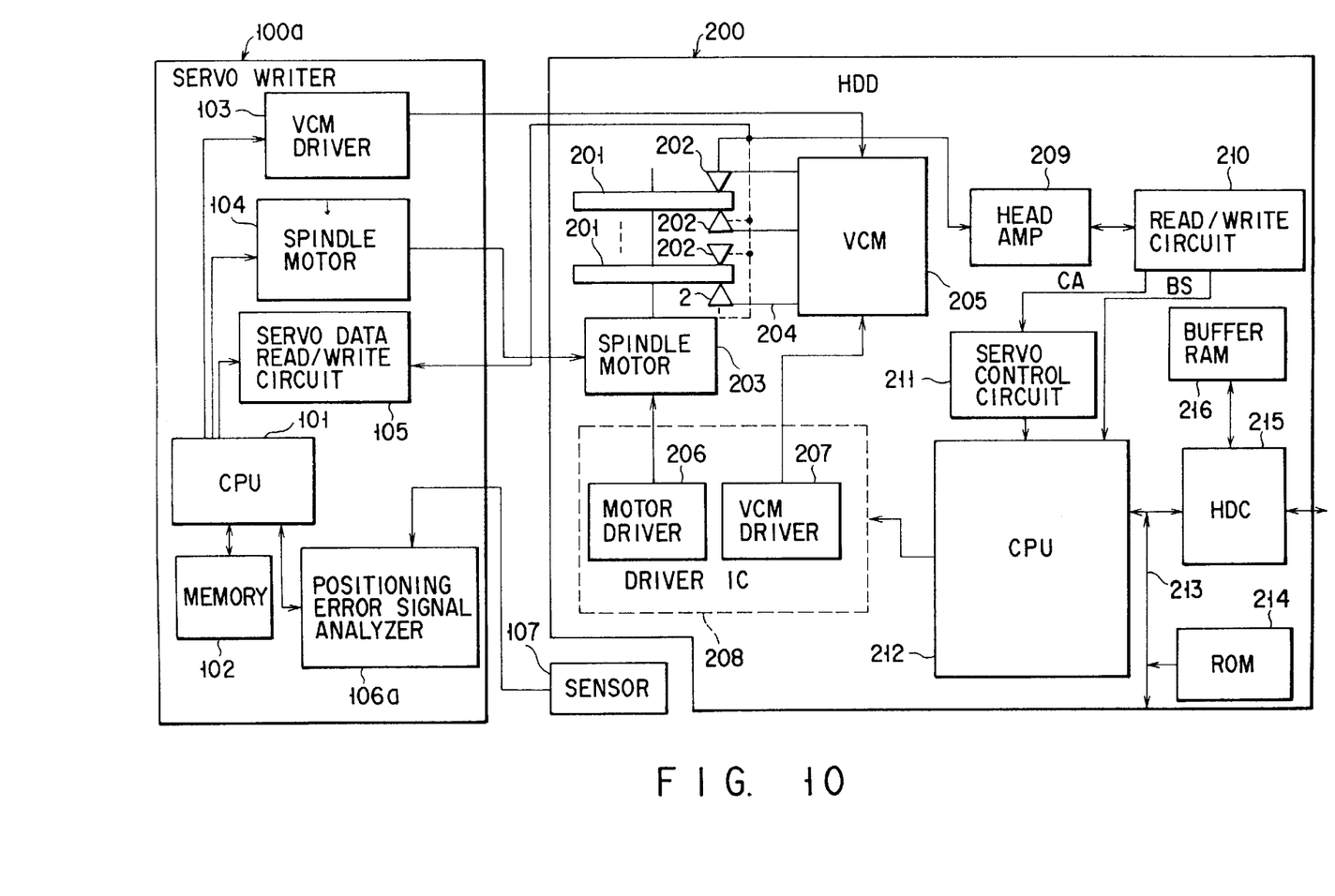
FIG. 10 is a block diagram showing a modified example of the servo writer shown in FIG. 4, in which a sensor is provided in the servo writer.

A vibration in the mechanical system may be directly measured and analyzed in the positioning error signal analyzer 106 by providing a laser Doppler vibrometer, a laser displacement gauge or a vibration measuring sensor such as an acceleration pickup and the like. That is, a sensor may be provided for detecting the occurrence of a resonance during writing of the servo data for error detection. A servo writer 100a and a magnetic disk drive 200 having such a structure are shown in FIG. 10. In the drawing, the same components as those in the above-described embodiment are given the same reference numerals and detailed description thereof will be omitted. In this modified example, a vibration measuring sensor 107 is provided outside the servo writer 100a.

Figure 7:
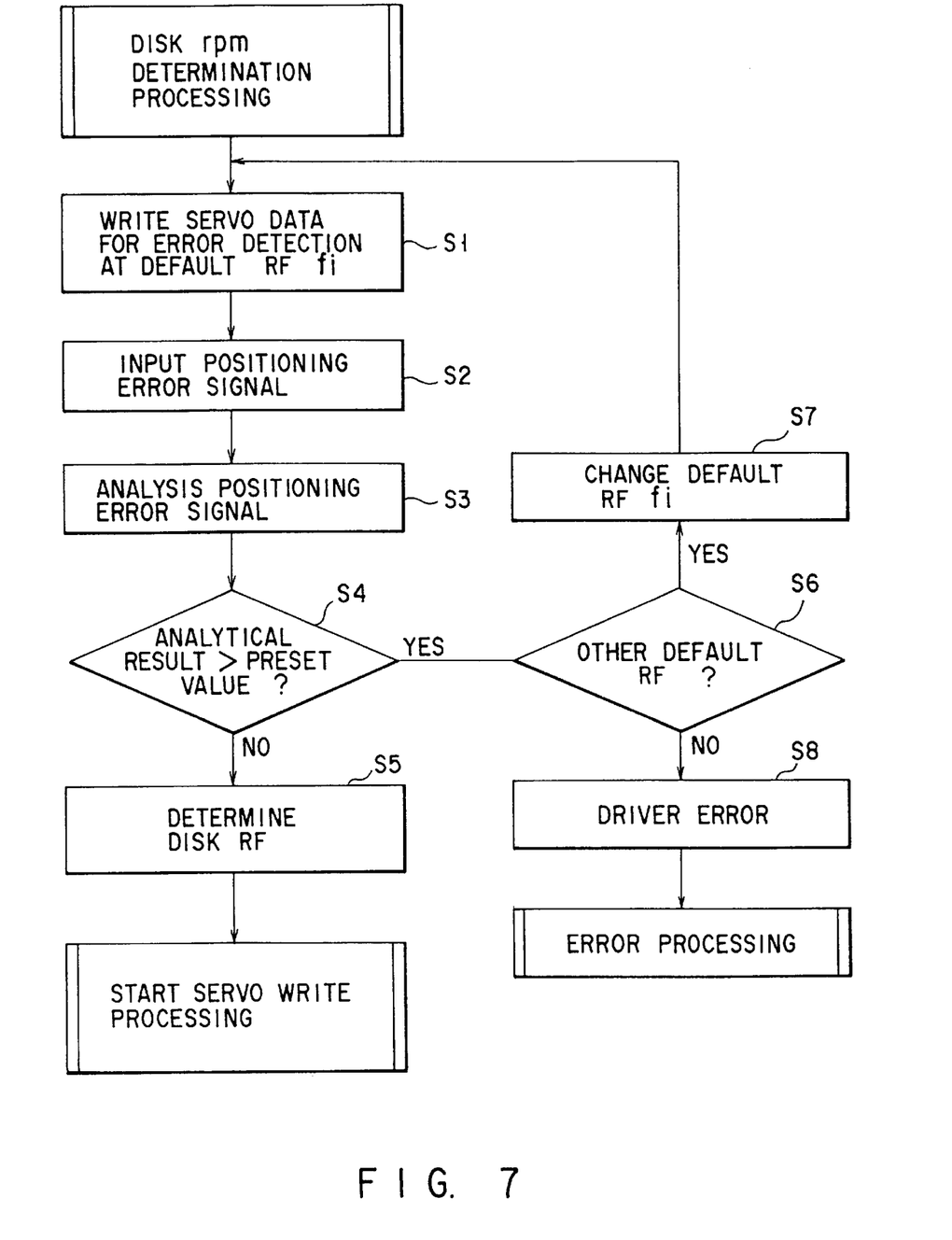
FIG. 7 is a flow chart showing a flow of disk rotation determination in the servo writer shown in FIG. 4.

In processing for determining a disk rotation frequency in this modified example, corresponding to step S2 and S3 of FIG. 7, a positioning error signal is analyzed by inputting a measured signal during writing of servo data for error detection using the sensor 107.

In such a manner, even when the sensor is provided in the outside, the same effect as that in the case of the above-described embodiment may be obtained.

Furthermore, according to the embodiment previously described, the servo data read/write circuit 105 is constructed in a manner that servo data is written by using the magnetic head of the targeted magnetic disk drive. However, this may be constructed in such a manner that a head exclusive for servo data writing is provided and servo data is written in the targeted magnetic disk by using this exclusive head. In this case, it is necessary to provide voice coil motor exclusive for positioning this exclusive head and control this.

As discussed above, according to the invention, servo data for error detection is written in the magnetic disk, and an optimal rotation frequency for the magnetic disk during servo data writing is determined from this servo data or a measured result during writing of this servo data. By rotating the magnetic disk at this rotation frequency, it is possible to improve the quality of servo data written in the magnetic disk without producing any resonance. Therefore, it is possible to highly accurately perform positioning control during use of the magnetic disk drive.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A magnetic disk drive in which servo writing is performed by a servo writer having writing means for writing data for measurement in a magnetic disk, detecting means for detecting a vibratory characteristic of said magnetic disk drive during writing of said data for measurement, and optimizing means for optimizing a rotation frequency of said magnetic disk in accordance with said vibratory characteristic detected by the detecting means, said magnetic disk drive comprising:

a magnetic disk in which servo data is written at said rotation frequency optimized by said optimizing means; and a spindle motor for rotating said magnetic disk.

2. A servo writer for writing servo data in a magnetic disk drive having a spindle motor and a magnetic disk for recording data rotated by the spindle motor, said servo writer comprising:

driving means for driving said spindle motor;

writing means for writing data in a specified area in said magnetic disk;

control means for controlling said driving means and said writing means, so as to rotate said magnetic disk at a predetermined rotation frequency and writing data for measurement in said magnetic disk;

detecting means for detecting a vibratory characteristic of said magnetic disk drive during writing of said data for measurement;

optimizing means for optimizing a rotation frequency of said magnetic disk, in accordance with said vibratory characteristic detected by said detecting means; and servo data writing means for controlling said driving means and said writing means, so as to write servo data at the rotation frequency optimized by said optimizing means.

3. A servo writer according to claim 2, wherein said optimizing means includes:

means for controlling said driving means and said writing means, so as to rotate said magnetic disk at a rotation frequency different from said predetermined rotation frequency and to write said data for measurement in said magnetic disk, when said vibratory characteristic does not satisfy a predetermined condition; and means for, when said vibratory characteristic satisfies said predetermined condition, determining said rotation frequency of said magnetic disk in which said vibratory characteristic is detected as an optimized rotation frequency.

4. A servo writer according to claim 2, wherein said detecting means reads said data for measurement written in said magnetic disk, and detects said vibratory characteristic from a positioning error of this read data for measurement.

5. A servo writer according to claim 4, wherein said detecting means reads said data for measurement written in said magnetic disk a predetermined number of times, and said positioning error indicates a vibration overlapping said data for measurement read said predetermined number of times.

6. A servo writer according to claim 4, wherein said positioning error indicates a vibration for a frequency from said read servo data for measurement.

7. A servo writer according to claim 2, wherein said detecting means is provided in a vicinity of said magnetic disk drive, having a sensor for detecting a vibration of said magnetic disk drive, and detecting a vibratory characteristic from this sensor during writing of said data for measurement.

8. A servo writer according to claim 2, wherein said optimizing means is provided with a plurality of data indicating rotation frequencies of said magnetic disk, and selects an optimal rotation frequency from the plurality of data.

9. A servo writing method in a serve writer for writing servo data in a magnetic disk drive having a spindle motor and a magnetic disk for recording data rotated by this spindle motor, the servo writer comprising a driving means for driving said spindle motor and writing means for writing data in a specified area in said magnetic disk, said method comprising the steps of:

controlling said driving means so as to rotate said magnetic disk at predetermined rotation frequency;

writing data for measurement in said magnetic disk;

detecting a vibratory characteristic of said disk drive during writing of said data for measurement;

optimizing a rotation of said magnetic disk in accordance with said vibratory characteristic detected by said detecting step; and controlling said driving means and said writing means so as to write servo data at said rotation speed optimized by said optimizing step.

10. A servo writing method according to claim 9, wherein said optimizing step includes a substep for controlling said driving means so as to rotate said magnetic disk at a rotation frequency different from said predetermined rotation frequency when said vibratory characteristic fails to satisfy a predetermined condition, and a substep for, when said vibratory characteristic satisfies said predetermined condition, determining said rotation frequency of said magnetic disk in which said vibratory characteristic is detected as an optimized rotation frequency.

11. A servo writing method according to claim 9, wherein said detecting step includes a substep for reading said data for measurement written in said magnetic disk, and detecting said vibratory characteristic from a positioning error of the read data for measurement.

12. A servo writing method according to claim 9, wherein said servo writer is provided in a vicinity of said magnetic disk drive and has a sensor for detecting a vibration of said magnetic disk, and said detecting step includes a substep for detecting a vibratory characteristic by said sensor during writing of said data for measurement from said sensor.

13. A servo writing method according to claim 9, wherein said servo writer has a memory for storing a plurality of data indicating rotation frequencies of said magnetic disk, and said optimizing step includes a substep for selecting an optimal rotation frequency from the plurality of data.

* * * * *